United States Patent
Kim et al.

(10) Patent No.: US 10,837,501 B2
(45) Date of Patent: Nov. 17, 2020

(54) CLUTCH HYDRAULIC CONTROL METHOD AND DOUBLE CLUTCH TRANSMISSION SYSTEM

(71) Applicants: Hyundai Motor Company, Seoul (KR); Kia Motors Corporation, Seoul (KR)

(72) Inventors: Joung-Chul Kim, Suwon-si (KR); Tae-Hee Cho, Hwaseong-si (KR); Kyoo-Ho Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 168 days.

(21) Appl. No.: 16/192,994

(22) Filed: Nov. 16, 2018

(65) Prior Publication Data

US 2019/0345990 A1    Nov. 14, 2019

(30) Foreign Application Priority Data

May 8, 2018   (KR) ........................ 10-2018-0052621

(51) Int. Cl.
   *F16D 48/06*   (2006.01)
   *F16D 48/02*   (2006.01)
   *F16D 21/00*   (2006.01)

(52) U.S. Cl.
   CPC ............ *F16D 25/14* (2013.01); *F16D 21/00* (2013.01); *F16D 48/0206* (2013.01); *F16D 2500/1026* (2013.01); *F16D 2500/30806* (2013.01)

(58) Field of Classification Search
   CPC ......... F16D 25/14; F16D 48/06; F16D 48/066
   See application file for complete search history.

(56) References Cited

U.S. PATENT DOCUMENTS

| 2014/0224613 A1* | 8/2014 | Versteyhe | F16D 48/066 |
| | | | 192/85.63 |
| 2015/0032341 A1* | 1/2015 | Kokko | B60W 10/02 |
| | | | 701/53 |
| 2016/0090093 A1* | 3/2016 | Neumann | B60W 10/02 |
| | | | 701/48 |
| 2018/0058520 A1* | 3/2018 | Saliga | F16D 25/14 |

FOREIGN PATENT DOCUMENTS

| JP | H 05-248527 A | 9/1993 |
| JP | 2005-016674 A | 1/2005 |
| JP | 2016-020710 A | 2/2016 |
| KR | 0450720 B1 | 7/1997 |
| KR | 2009-0104250 A | 10/2009 |

* cited by examiner

*Primary Examiner* — Edwin A Young
(74) *Attorney, Agent, or Firm* — Morgan, Lewis & Bockius LLP

(57) ABSTRACT

A clutch hydraulic control method and the double clutch transmission system may include performing a clutch pack flow rate control, which pre-fills a flow rate for clutch engage in a clutch pack of a clutch before shifting, when a shifting attempt is detected in a clutch controller.

17 Claims, 9 Drawing Sheets

CLUTCH HYDRAULIC CONTROL METHOD AND DOUBLE CLUTCH TRANSMISSION SYSTEM

CROSS-REFERENCE(S) TO RELATED APPLICATIONS

The present application claims priority to Korean Patent Application No. 10-2018-0052621, filed on May 8, 2018, the entire contents of which is incorporated herein for all purposes by this reference.

BACKGROUND OF THE INVENTION

Field of the Invention

The present invention relates to a clutch of a double clutch transmission, and more particularly, to the improvement in a hydraulic control responsiveness of a clutch for operation of a double clutch transmission.

Description of Related Art

Eco-friendly technology in vehicles is a core technology with survival of the future vehicle industry, and vehicle makers are concentrating on developing eco-friendly vehicles to achieve environmental and fuel efficiency regulations.

The future type of vehicle technology may include an Electric Vehicle (EV) and a Hybrid Electric Vehicle (HEV) using electrical energy.

Recently, the improvement in fuel efficiency and eco-friendliness have become a key goal for vehicle development due to a high oil price and $CO_2$ regulation, and many vehicle makers are developing technologies to reduce fuel consumption to achieve the goal.

Accordingly, a Dual Clutch Transmission (DCT), which is relatively low in power loss upon shifting to contribute to the improvement in fuel efficiency and improves efficiency and convenience, may be an example.

As described above, the DCT related to the present invention has two clutch devices in an automatic transmission and a gear train of a basic manual transmission, and selectively delivers the RPM, which is inputted from an engine, to two input shafts using two clutches, and outputs it after shifting.

Such a DCT requires different hydraulic pressure and flow rate depending on an operating part, such that it is required that the hydraulic pressure and the flow rate depending upon the operating portion may be supplied, and there is a method of controlling the dual clutch through the hydraulic supply by a control method, or a method of supplying the hydraulic pressure to a wet clutch as a control method.

To supply the hydraulic pressure, a hydraulic circuit is generally constituted, the hydraulic circuit is provided with a flow path connecting each member and an oil tank to a valve body, and a plurality of valves provided in the flow path, and by controlling the opening or closing of the plurality of valves, the oil inflow timing to each member and the inflowing oil pressure are controlled.

Meanwhile, the wet DCT has the section filling the flow rate volume of the wet clutch pack compared to the dry DCT, and in the present time, there is a problem in that the hydraulic pressure rise delay and the control response delay are caused by the clutch volume fill section.

The contents described in Description of Related Art are to help the understanding of the background of the present invention, and may include what is not previously known to those skilled in the art to which the present invention pertains.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch hydraulic control method and a double clutch transmission system, which can pre-fill the volume section of the clutch pack in which the hydraulic pressure for the shifting operation is formed before the shifting operation, thus improving the flow rate filling delay phenomenon causing the response delay of the clutch.

According to various aspects of the present invention, when a shifting attempt is detected in a clutch controller, a clutch pack flow rate control, which pre-fills the flow rate for clutch engage in a clutch pack of a clutch before shifting, is performed.

The clutch pack flow rate control can start upon Disengage Open of the clutch.

The Disengage Open makes a determination as to whether the flow rate of the clutch pack 1-1 is drained.

The clutch pack flow rate control may include controlling pre-fill pressure performing the clutch pack 1-1 up to a return spring preload amount, and controlling fill pressure overcoming the return spring preload amount and performing until upon the compression of the clutch pack 1-1.

The controlling of the pre-fill pressure may include dividing pre-fill target pressure for the clutch pack 1-1; controlling pre-fill flow path filling the flow rate in a flow path connected to the clutch pack 1-1; and controlling pre-fill hydraulic pressure forming the pre-fill target pressure on the clutch pack 1-1.

The pre-fill target pressure may be divided depending upon whether or not a clutch engagement signal depending upon the shifting attempt is detected.

The pre-fill target pressure upon detection of the clutch engagement signal may be set to be higher than upon non-detection thereof.

The controlling of the fill pressure may include controlling fill target pressure applied by dividing FILL target pressure for the clutch pack 1-1 into a fill phase section; controlling shake adding shake pressure to the FILL target pressure; and stopping fill target pressure terminated after confirming the arrival of the FILL target pressure with measurement pressure for the clutch pack 1-1.

The fill phase section may include a Chop phase in which FILL CHOP pressure is formed, a Dec1 phase in which FILL BASE pressure is formed, a Hold phase in which FILL HOLD pressure is formed, and a Dec2 phase in which the FILL target pressure is formed; the controlling of the fill target pressure may be applied in the order of the Chop phase, the Dec1 phase, the Hold phase, and the Dec2 phase, and the stopping the fill target pressure may be performed when the measurement pressure is greater than clutch ENGAGE target hydraulic pressure of a Shifting phase following the Dec2 phase.

Each of the FILL CHOP pressure, the FILL BASE pressure, the FILL HOLD pressure, and the FILL target pressure may be applied with a threshold value, and the application may be stopped upon reaching the threshold value.

The FILL CHOP pressure may be greater than the FILL BASE pressure, the FILL BASE pressure may be greater than the FILL HOLD pressure, and the FILL target pressure may be equal to or greater than the clutch ENGAGE target hydraulic pressure.

The shake pressure may be applied to the fill phase section.

The shake pressure may be formed by short cycle hydraulic vibration of a valve 160 for supplying the flow rate to the clutch pack 1-1.

The shake pressure may be set to have a cycle.

According to various aspects of the present invention, a clutch controller for performing a clutch pack flow rate control by a pre-fill pressure control filling a flow rate in a clutch pack 1-1 up to a return spring preload amount in Disengage Open in which the flow rate of a clutch 1 is all drained in the clutch pack 1-1 when a shifting attempt is detected; and a fill pressure control overcoming the return spring preload amount and filling the flow rate until upon the compression of the clutch pack 1-1 may be included.

The clutch controller may include a clutch fill map 120, and the clutch fill map 120 may be provided with a table by mapping pre-fill pressure for the pre-fill pressure control with fill pressure for the fill pressure control.

The clutch controller controls a valve 160 to supply the flow rate to the clutch pack 1-1.

The valve 160 may be a solenoid valve.

According to the exemplary embodiment of the present invention, the hydraulic control method and the hydraulic control system for controlling the double clutch transmission can obtain the hydraulic control responsiveness only by controlling the hydraulic pressure to improve the oscillation and the transmission feeling, and also introduce a high-performance hydraulic fill pressure control to ensure fast responsiveness and to improve the control precision.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
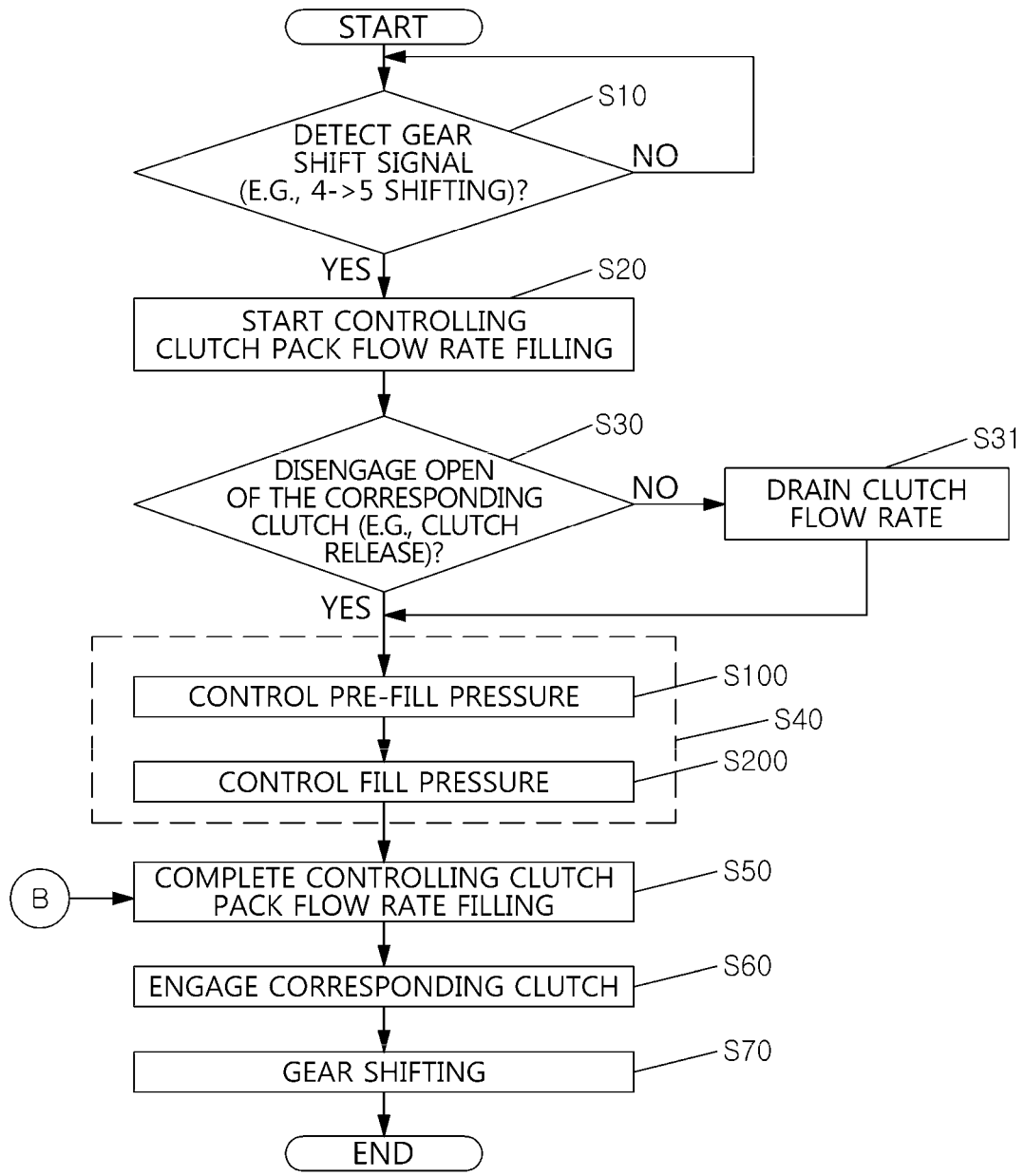
FIG. 1 is a flowchart illustrating a hydraulic control method for controlling a double clutch transmission in accordance with various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The exemplary embodiments described below are provided so that those skilled in the art can easily understand the technical spirit of the present invention, and thus the present invention is not limited thereto. Furthermore, the matters described in the appended drawings may be different from those actually implemented by the schematized drawings to easily describe the exemplary embodiments of the present invention.

It will be understood that when an element is referred to as being "connected" or "coupled" to another element, it may be "directly connected" or "coupled" to the other element, but also to the other element with other elements interposed therebetween.

The term "connection" as used herein means a direct connection or indirect connection between one member and the other member, and can refer to all physical connections such as adhesion, attachment, fastening, bonding, and coupling, etc.

The terms "first" and/or "second," and the like are used to distinguish a plurality of components, but does not limit the order between the components or other features.

The singular forms are intended to include the plural forms as well, unless the context clearly indicates otherwise. In the specification, it will be understood that the terms "comprises" or "includes," and the like specify the presence of stated features, integers, steps, operations, elements, components or combination thereof, but do not preclude the addition of one or more other features, integers, steps, operations, elements, components, or a combination thereof.

FIG. 1 is a flowchart illustrating a hydraulic control method for controlling a double clutch transmission in accordance with various exemplary embodiments of the present invention.

Hereinafter, the definition of the pressure is as follows.

$P1_{pre\text{-}fill\_target}$ is the clutch engagement PRE-FILL target pressure (e.g., 3 BAR), which is the pressure at which the clutch PACK volume is filled to the level of the return spring (RETURN SPRING) preload amount (e.g., 4 BAR) or less of a clutch when the shifting clutch has been engaged.

$P2_{pre\text{-}fill\_target}$ is the gear non-engagement PRE-FILL target pressure (e.g., 1 BAR), which is the pressure at which the clutch PACK volume is filled to the level of the return spring (RETURN SPRING) preload amount (e.g., 4 BAR) or less of a clutch when the shifting gear has not been engaged.

$P_{fill\_target}$ is the FILL target pressure (e.g., 8 BAR), which is the pressure at which the clutch FILL volume is filled and the clutch can begin torque delivery while meeting clutch touch point (TOUCH POINT pass). If necessary, the pressure section is SHAKE-controlled by $P_{shake}$.

$P_{fill\_chop}$ is the FILL CHOP pressure (e.g., 12 BAR), which is the CHOP section formed in the initial FILL control and is the high pressure formed during a certain time to overcome the inertia of the initial hydraulic pressure upon the formation of the FILL control pressure (i.e., $P_{press}$) and to rapidly form the hydraulic pressure in the initial stage. If necessary, the pressure section is SHAKE-controlled by the $P_{shake}$.

$P_{fill\_base}$ hold is the FILL BASE pressure, which is the pressure for the CHOP to form a relatively narrow, high trajectory control pressure while sloping down hydraulic height from the $P_{fill\_chop}$ to the $P_{fill\_hold}$ rather than the vertical downward direction thereof. If necessary, the pressure section is SHAKE-controlled by the $P_{shake}$.

$P_{fill\_hold}$ is the FILL HOLD pressure (e.g., 8 BAR), which may be the main pressure for FILL control and the same as the $P_{fill\_base}$ hold. If necessary, the pressure section is SHAKE-controlled by the $P_{shake}$.

$P_{check}$ is the clutch PACK measurement hydraulic pressure, which is the actual pressure of the clutch PACK detected by a clutch pressure sensor.

$P_{target}$ is the clutch ENGAGE target hydraulic pressure (e.g., 6 BAR), which is the pressure that the hydraulic pressure, which fills the clutch PACK volume after the corresponding clutch has applied a pressure exceeding the return spring (RETURN SPRING) preload amount (e.g., 4 BAR) or more, advances the clutch and delivers the power through the touch point section where the power is delivered. In the instant case, it may be the same as clutch engagement pressure (SHIFT START PRESSURE). Accordingly, the $P_{target}$ means a target press indicating a Shifting Phase.

$P_{shake}$ is the SHAKE pressure, which is determined by the $P_{fill\_target}$ and the $P_{press}$ to more actively (ACTIVE) support the movement of a valve (e.g., a solenoid valve) to smooth the flow of flow rate.

$P_{press}$ is the FILL control pressure, which collectively refers to the hydraulic pressure which is set for PRE-FILL and FILL.

$P_{fill\_target}$ is the FILL target pressure, which is the pressure at which the HOLD can form a relatively narrow, high trajectory control pressure while sloping down hydraulic height from the $P_{fill\_hold}$ to the $P_{target}$ rather than the vertical downward direction thereof. If necessary, the pressure section is SHAKE-controlled by the $P_{shake}$.

Accordingly, the pressure is set to have the following relationship.

It is set to have the relationship of $P_{fill\_chop} > P_{fill\_base\ hold} > P_{fill\_hold} > P_{fill\_target} > P_{target} >$ Return spring preload $> P1_{pre\text{-}fill\_target} > P2_{pre\text{-}fill\_target}$. ">" is an inequality indicating the magnitude of the two values.

Referring to FIG. 1, as a method of controlling a hydraulic device configured for controlling a double clutch transmission, which sets an oil supply target hydraulic pressure of a clutch pack upon gear shifting to control the oil supply pressure and includes controlling pre-fill pressure S100 supplying oil to the flow path up to the clutch pack and controlling fill pressure S200 supplying the oil to the clutch pack.

In the instant case, the control body is a clutch controller 110, and the control object is a clutch pack 1-1 of a clutch 1 that the clutch pack flow rate is filled through a valve 160.

The controlling of the pre-fill pressure S100 determines whether or not the clutch has been released S30, and is performed when the clutch is disengage-opened, that is, when the clutch has been released. However, it is performed after the flow rate of the clutch is drained S31 when the clutch is not released.

Firstly, the hydraulic control method for controlling the double clutch transmission in accordance with the exemplary embodiment of the present invention determines whether or not a gear shift signal has been detected S10, and starts a clutch pack flow rate filling control when the gear shift signal is detected S20.

As such, it is determined whether or not the clutch has been released S30, and the controlling of the pre-fill pressure S100 supplying oil to the flow path up to the clutch pack and the controlling of the fill pressure S200 supplying the oil to the clutch pack are performed.

After performing the controlling of the pre-fill pressure S100 and the controlling of the fill pressure S200 supplying the oil to the clutch pack, the clutch pack flow rate filling control is completed S50, and the gear is shifted S70 after engaging the corresponding clutch to be terminated.

Figure 2:
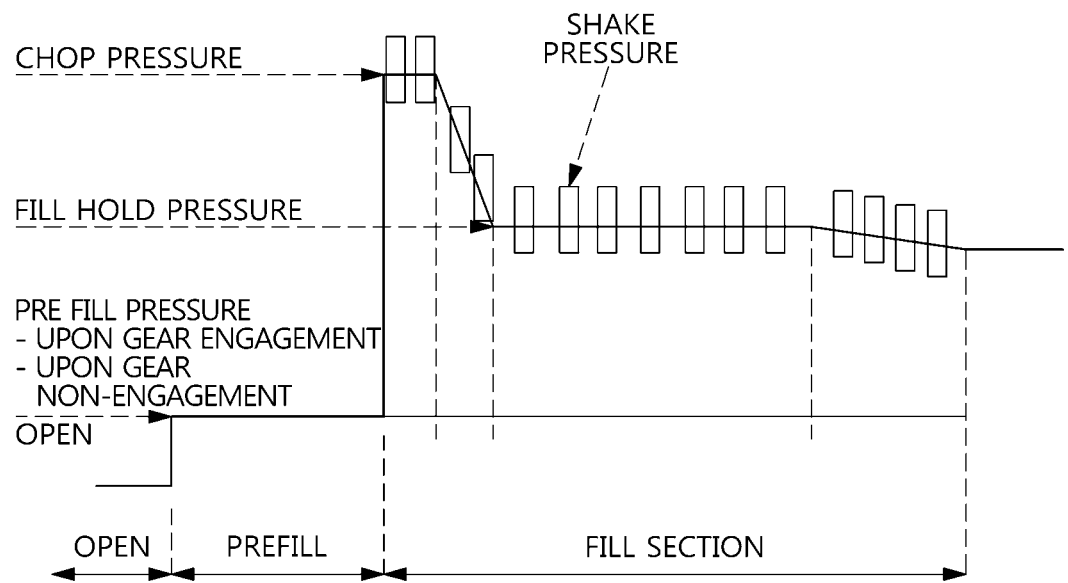
FIG. 2 is a hydraulic control line diagram of a clutch pack flow rate filling control in accordance with an exemplary embodiment of the present invention.

FIG. 2 is a hydraulic control line diagram of the clutch pack flow rate filling control in accordance with the exemplary embodiment of the present invention.

Referring to FIG. 2, the hydraulic control diagram of the clutch pack flow rate filling control may include an open section, a pre-fill section, and a fill section; and the open section enters into the pre-fill section when the corresponding clutch has been released, and when the corresponding clutch has not been released, it enters into the pre-fill section after the flow rate of the clutch is drained.

According to an exemplary embodiment of the present invention, the pre-fill target pressure is confirmed in the pre-fill section and the flow path is controlled by the pre-fill target pressure when a clutch engagement signal is detected, and otherwise, when the clutch engagement signal is not detected, the pre-fill target pressure is changed to be lower than the pre-fill target pressure when the clutch engagement signal is detected.

Accordingly, by controlling the flow path from the valve body to the clutch pack and forming the fill pressure with a partial pressure of the preload amount of the return spring, thus improving the hydraulic responsiveness.

As such, when the control in the pre-fill section is performed, it enters into the fill section; in the fill section, the chop pressure is reduced after applying the chop pressure and the fill hold pressure is reduced after applying the fill hold pressure; and in each section, the shake pressure may be added to pressurize.

The chop pressure is to flow rapidly beyond the inertia resistance of the initial hydraulic volume, the hold pressure serves as the main fill pressure, and the shake pressure smoothens the flow of the flow rate.

Figure 3:
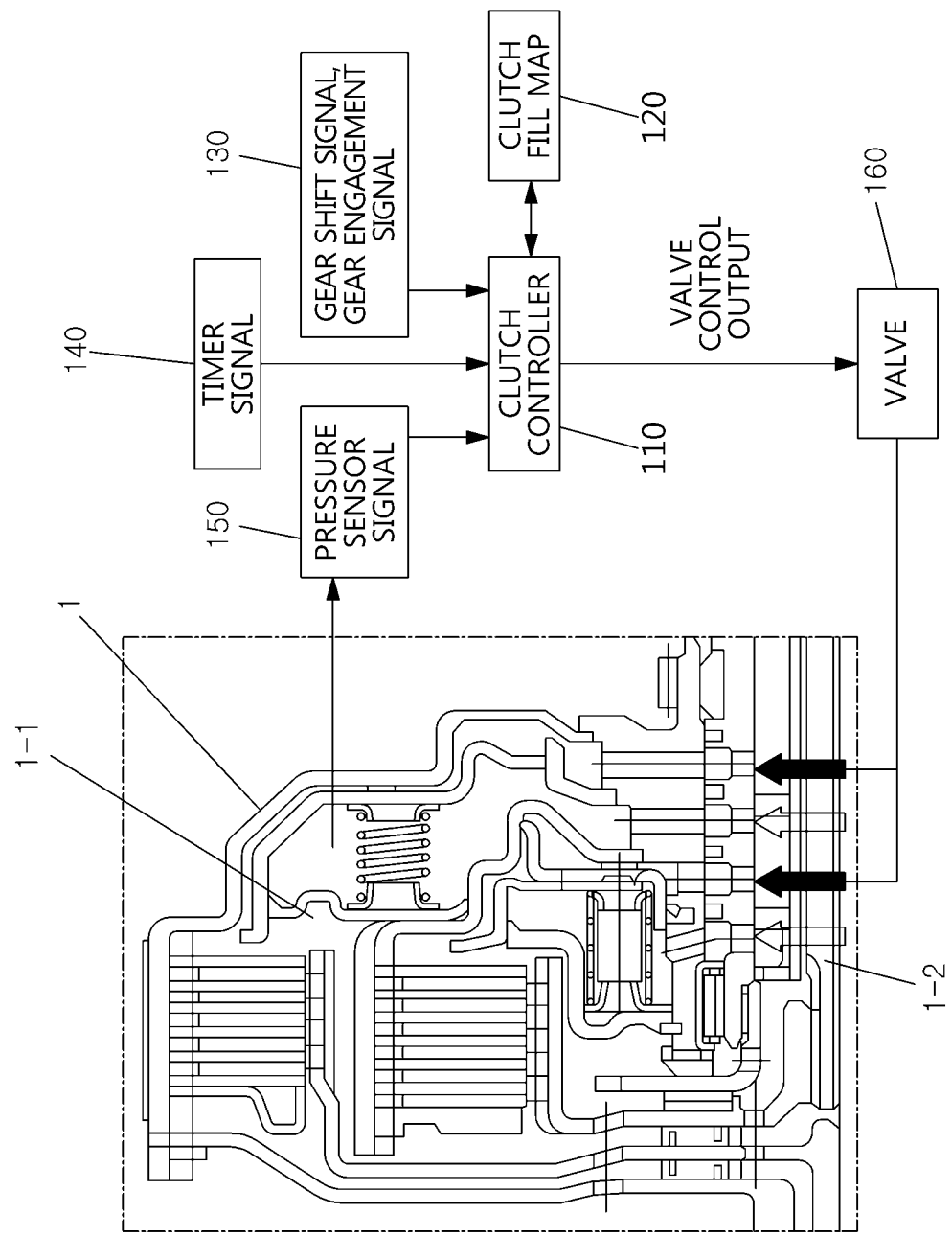
FIG. 3 is a schematic diagram of the hydraulic control system for controlling the double clutch transmission in accordance with an exemplary embodiment of the present invention.

FIG. 3 is a schematic diagram of a hydraulic control system for controlling the double clutch transmission in accordance with the exemplary embodiment of the present invention.

Referring to FIG. 3, the clutch controller 110 performs overall control. The clutch controller 110 is interlocked with a clutch fill map 120 together with the detection factor for the clutch pack flow rate filling control to control the valve 160 to perform a flow rate filling control for the clutch pack 1-1 of the clutch 1.

For example, the clutch 1 is the clutch for the double clutch transmission, and the clutch pack 1-1 includes a disk, a clutch piston, etc. For power connection with the return spring (RETURN SPRING) having the preload (e.g., 4 BAR), and is the same as the clutch for a general double clutch transmission which is coupled to a transmission shaft 1-2 to receive clutch lubricating oil supply and clutch operating hydraulic pressure.

For example, the clutch controller 110 can control the valve 160 using a Pulse Wide Modulation (PWM) DUTY or an ON/OFF signal. The clutch controller 110 may include a computation device configured for computing the pre-fill pressure and the fill pressure, a determination device configured for determining the shake pressure for the fill pressure, and an output device configured for generating a control signal for each of the pre-fill pressure/the fill pressure/the shake pressure. Furthermore, the clutch controller 110 may be a separate dedicated controller, but may be a Transmission Control Unit (TCU). The clutch fill map 120 is provided as a table in which each of the pre-fill pressure/the fill pressure/the shake pressure is mapped.

For example, the detection factor includes a shift lever 130 for detecting a gear shift signal and a clutch engagement signal, a timer 140 for generating a timer signal, and a pressure sensor 150 for detecting the pressure of the clutch pack 1-1 by a clutch PACK measurement hydraulic pressure ($P_{check}$).

For example, the valve 160 controls the flow path from the transmission shaft 1-2 to the clutch pack 1-1, and is formed of a solenoid valve.

Figure 4:
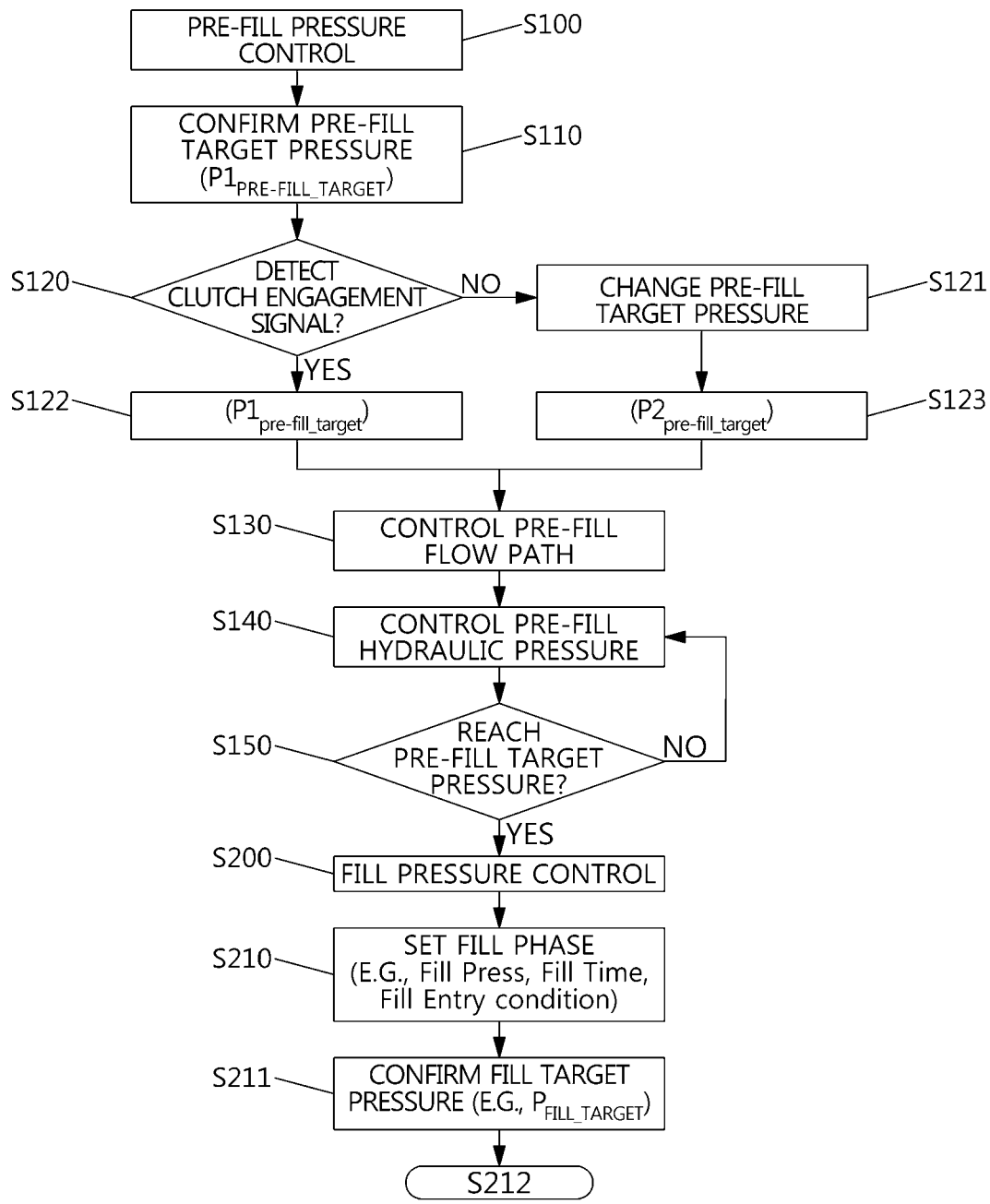
FIG. 4 and FIG. 5 are a specific flowchart of the hydraulic control method for controlling the double clutch transmission in accordance with the exemplary embodiment of the present invention of FIG. 1.
Figure 5:
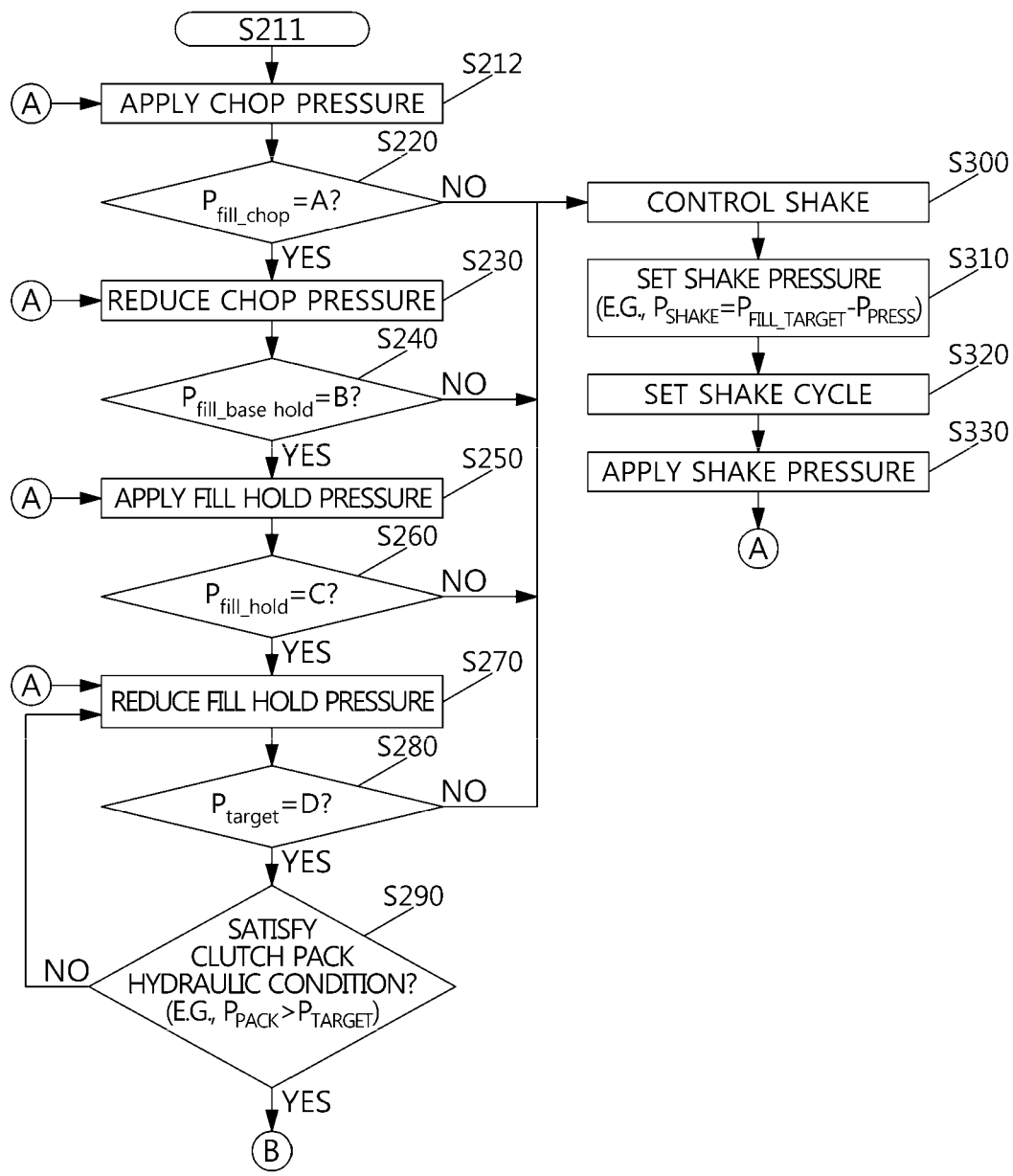

FIG. 4 and FIG. 5 are a specific flowchart of the hydraulic control method for controlling the double clutch transmission in accordance with the exemplary embodiment of the present invention of FIG. 1.

Referring to FIG. 4 and FIG. 5, there is illustrated a specific flowchart of the controlling of the pre-fill pressure S100 supplying oil to the flow path up to the clutch pack and the controlling of the fill pressure S200 supplying the oil to the clutch pack.

First, in describing the controlling of the pre-fill pressure S100, the pre-fill target pressure ($P1_{pre-fill\_target}$) is confirmed. In the present time, it is determined whether or not the clutch engagement signal has been detected S120, and when the clutch engagement signal is detected, the flow path is controlled by the pre-fill target pressure ($P1_{pre-fill\_target}$) S130. Otherwise, it is determined whether or not the clutch engagement signal has been detected S120, and when the clutch engagement signal is not detected, the pre-fill target pressure is changed S121 to be changed to the pre-fill target pressure $P2_{pre-fill\_target}$ lower than the $P1_{pre-fill\_target}$ to control the flow path S140.

As described above, by dividing the pre-fill target pressure into the $P1_{pre-fill\_target}$ and the $P2_{pre-fill\_target}$ in the controlling of the pre-fill pressure S100, depending upon the characteristics of the double clutch transmission, the gear is first engaged and then the clutch is engaged, and when the PRE-FILL pressure becomes very high to become the level of the clutch touch point MEET, the shifting fails due to the disturbance of the clutch engagement, such that the target of the PRE-FILL pressure should be carefully set. Accordingly, the target of the PRE-FILL pressure is set differently depending on whether or not the gear of the corresponding clutch has been engaged.

The pre-fill flow path is controlled S130, the pre-fill hydraulic pressure is controlled S140, and then it is determined whether or not the pre-fill target pressure has been reached S150. In the present time, the fill pressure control S200 is performed when reaching the pre-fill target pressure, and the pre-fill hydraulic control S140 is continuously performed if not reaching the pre-fill target pressure.

In the instant case, the PRE-FILL flow path control S130 fills a flow path from the valve body to a clutch piston through a clutch case when the flow rate is supplied. On the other hand, the PRE-FILL hydraulic control S140 further supplies a flow rate to the clutch piston and increases the hydraulic pressure to overcome the preload amount of the return spring.

The fill pressure control S200 in accordance with an exemplary embodiment of the present invention sets a Fill Phase S210, and the Fill Phase includes, for example, Fill Press, Fill Time, Fill Entry condition, etc.

Figure 6:
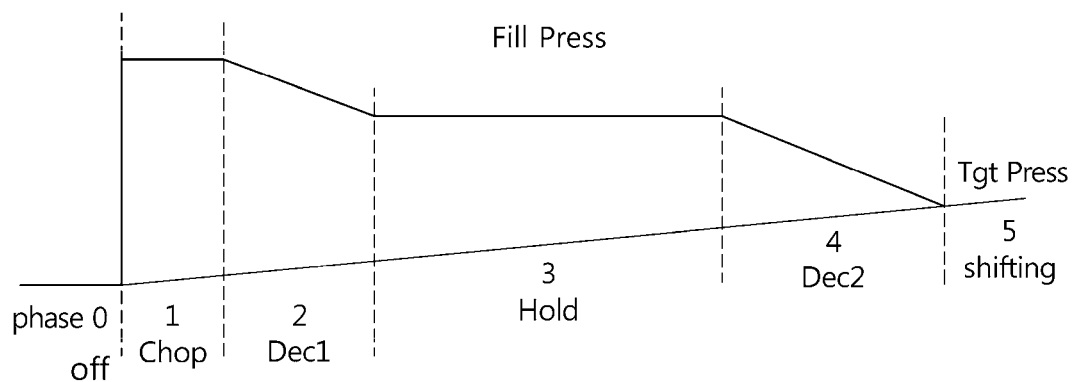
FIG. 6 is a Fill Phase line diagram of the hydraulic control method for controlling the double clutch transmission in accordance with the exemplary embodiment of the present invention.

Referring to FIG. 6, the Fill Phase is set by the Fill Press setting, the Fill Time setting, a Fill Entry condition change, etc.

The Fill Phase is divided into 0 to 5 phases, and the Fill Press is divided into Chop, Dec1, Hold, Dec2, and Shifting phase sections.

The Fill Press is for checking the pressure which is set in the fill pressure control S200.

The Fill Time is applied to the Chop phase of the Chop section, the Dec1 phase of the Dec1 section, the Hold phase of the Hold section, the Dec2 phase of the Dec2 section, and the Shifting phase of the Shifting section, respectively, and when a high time and a low time become greater than 0 in the required section, it is applied to each phase.

The Dec1 phase is set in a trapezoidal section of the $P_{fill\_base}$ hold from $P_{fill\_chop}$ to $P_{fill\_hold}$, and the Dec2 phase cannot be time-set in a trapezoidal section of the $P_{fill\_target}$ from $P_{fill\_hold}$ to $P_{target}$, but in the instant case, the Dec1 phase is set to be released when meeting the $P_{fill\_hold}$ and the Dec2 phase is set to be released when meeting the $P_{target}$.

The Fill Entry condition is considered only upon shifting by considering the torque condition in the Take-up state.

As such, after the Fill Phase is set S210, the Fill target pressure is confirmed S211. For example, the Fill target pressure is set to $P_{fill\_target}$.

When the Fill target pressure is set, the pressurization is performed, and the application of the Chop pressure S212, the reduction in the Chop pressure S230, the application of the Fill Hold pressure S250, and the reduction in the Fill Hold pressure S270 are sequentially controlled.

In an exemplary embodiment of the present invention, when the Chop pressure is applied S212, it is determined whether or not the Fill initial pressure ($P_{fill\_chop}$) is A, and when the condition reaches A, it enters into the reduction in the Chop pressure S230. However, it is determined whether or not the Fill initial pressure ($P_{fill\_chop}$) is A S220, and when the condition does not reach A, it enters into a shake control S300.

In the instant case, the "A" is a threshold value, which can change depending on the specification of the clutch 1, but may be about 10 BAR.

As such, when entering into the reduction in the Chop pressure S230, it is determined whether or not the Fill Base pressure ($P_{fill\_base}$ hold) is B S240, and when the condition reaches B, the application of the Fill Hold pressure S250 is performed. However, it is determined whether or not the Fill initial pressure ($P_{fill\_chop}$) is B, and when the condition does not reach B, it enters into the shake control S300.

In the instant case, the "B" is a threshold value, which can change depending on the specification of the clutch 1, but may be somewhat higher than about 8 BAR.

Furthermore, when entering into the application of the Fill Hold pressure S250, it is determined whether or not the Fill Hold pressure ($P_{fill\_hold}$) is C S260, and when the condition reaches C S250, it enters into the reduction in the Fill Hold pressure S270. It is determined whether or not the Fill Hold pressure ($P_{fill\_hold}$) is C S260, and when the condition does not reach C, it enters into the shake control S300.

In the instant case, the "C" is a threshold value, which can change depending on the specification of the clutch 1, but may be about 8 BAR.

As such, when entering into the reduction in the Fill Hold pressure S270, it is determined whether or not the clutch engage target hydraulic pressure ($P_{target}$) is D S280, and when the condition reaches D, it enters into determining clutch pack hydraulic condition satisfaction S290. However, it is determined whether or not the clutch engage target hydraulic pressure ($P_{target}$) is D, and when the condition does not reach D, it enters into the shake control S300.

In the instant case, the "D" is a threshold value, which can change depending on the specification of the clutch 1, but may be somewhat higher than about 6 BAR.

Finally, it is determined whether or not the clutch pack hydraulic condition has been satisfied S290. Whether or not the clutch pack hydraulic condition is satisfied is determined by $P_{check} > P_{target}$.

Herein, the $P_{check}$ refers to the clutch pack measurement hydraulic pressure, and the $P_{target}$ refers to the clutch engage target hydraulic pressure. ">" is an inequality indicating the magnitude relationship between two values.

Accordingly, when the condition is satisfied in the determining the clutch pack hydraulic condition satisfaction S290, for example, in the clutch pack measurement hydraulic pressure ($P_{check}$)>the clutch target hydraulic pressure ($P_{target}$), it enters into completing the clutch pack flow rate filling control S50. However, when the clutch pack measurement hydraulic pressure ($P_{check}$)>the clutch engage target hydraulic pressure ($P_{target}$) condition is not satisfied, it goes back to the reduction in the Fill Hold pressure S270.

The shake control S300 in accordance with an exemplary embodiment of the present invention enters into setting shake cycle S320 when the shake pressure is set S310, and then enters into applying the shake pressure S330.

As a result, by applying the shake control S300, the movement of the hydraulic solenoid of the valve 160 is smoothed by adding the hydraulic vibration of short cycle, thus contributing to the formation of the fill pressure.

Figure 7:
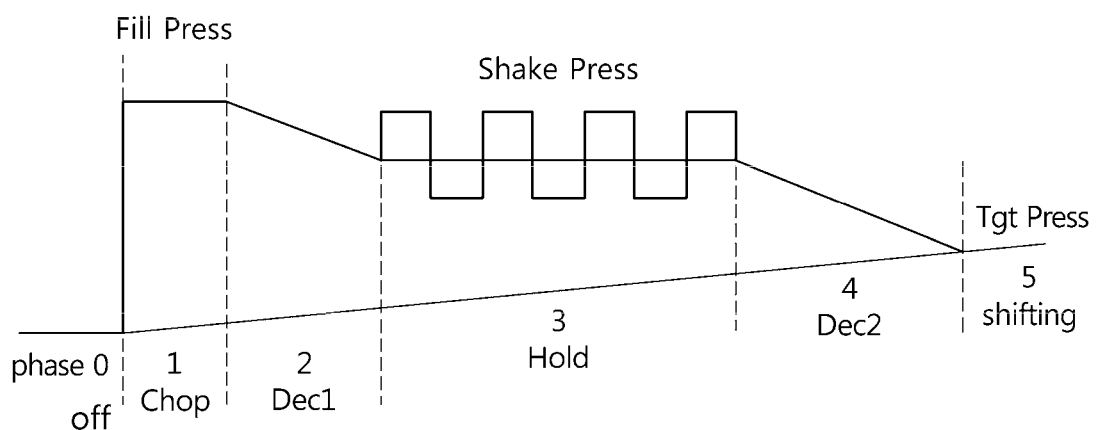
FIG. 7 is a Shake control line diagram of the hydraulic control method for controlling the double clutch transmission in accordance with the exemplary embodiment of the present invention.

Referring to FIG. 7, the entry condition of the shake control is that the Dec1 phase or the Dec2 phase performs the fill control using the $P_{target}$, and the high time of the corresponding fill phase is greater than zero.

A pressure determination in the shake control is obtained by the relationship of $P_{press}$ [fill press (Fill Press)]+$P_{shake}$ [shake press (Shake Press)] as a final fill control pressure, and the shake press is set as $P_{shake}$ by subtracting the fill press from the final fill control pressure. Accordingly, a configuration of the SHAKE control can add SHAKE pressure for fill pressure depending on the selection in each section of fill control. For example, the pressure in the shake control has the relationship of [$P_{shake} = P_{fill\_target} - P_{press}$]. Herein, the $P_{shake}$ refers to the shake pressure, the $P_{fill\_target}$ to the final fill pressure, and the $P_{press}$ to the fill pressure.

Furthermore, the SHAKE control can set a hydraulic height and a maintenance time upon ON of the SHAKE control, and a hydraulic height and a maintenance time upon OFF of the SHAKE control to satisfy the relationship of $P_{press}$ [fill press (Fill Press)]+$P_{shake}$ [shake press (Shake Press)].

By pressurizing with the application of the chop pressure S212, the reduction in the chop pressure S230, the application of the fill hold pressure S250, and the reduction in the fill hold pressure S270 by the shake control S300, the responsiveness and the accuracy may be improved.

Figure 8:
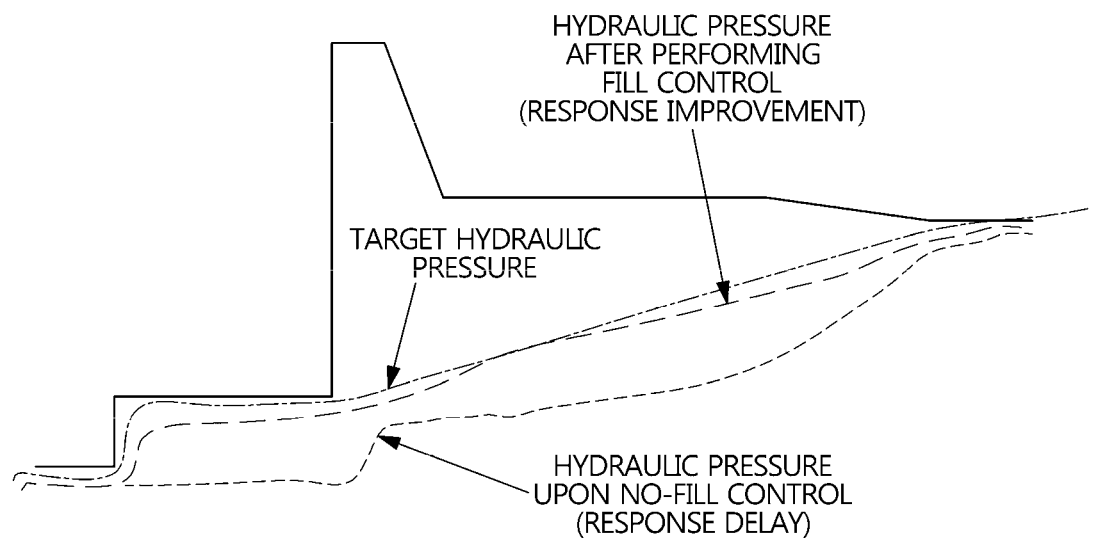
FIG. 8 is a target hydraulic follow-up line diagram of a clutch pack flow rate filling control of the hydraulic control method for controlling the double clutch transmission in accordance with the exemplary embodiment of the present invention.

FIG. 8 is a target hydraulic follow-up line diagram of the clutch pack flow rate filling control of the hydraulic control method for controlling the double clutch transmission in accordance with the exemplary embodiment of the present invention.

Referring to FIG. 8, the improvement effect in the fill hydraulic control is illustrated, and it may be seen that a response delay is generated compared with the target hydraulic pressure when the fill control is not performed. On the other hand, it may be seen that the response has been significantly improved without a response delay depending upon the target hydraulic pressure upon the fill control.

Figure 9:
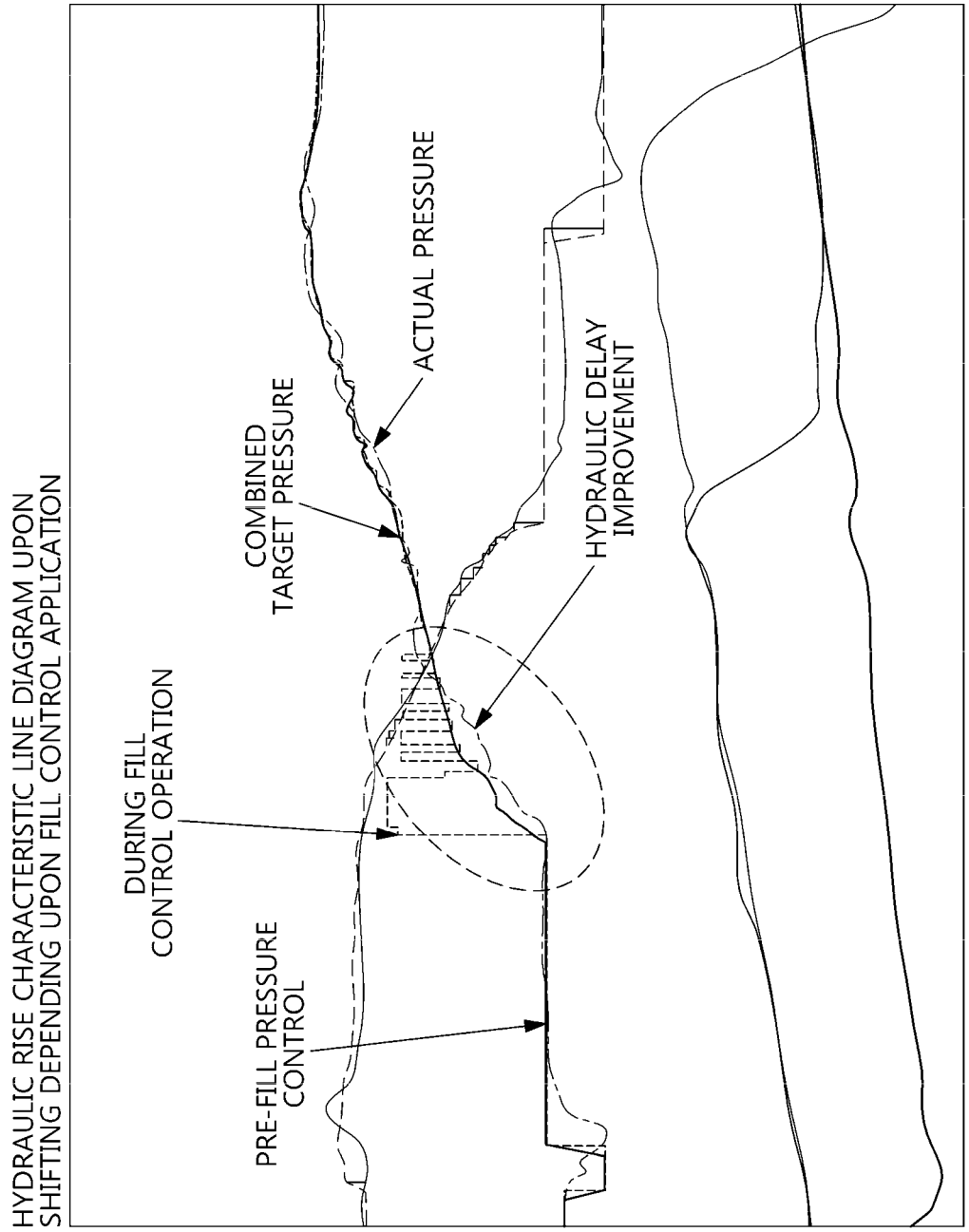
FIG. 9 is a hydraulic rise characteristic line diagram upon shifting depending upon the fill control application in the hydraulic control method for controlling the double clutch transmission in accordance with the exemplary embodiment of the present invention.

FIG. 9 is a hydraulic rise characteristic line diagram upon shifting depending upon the fill control application of the hydraulic control method for controlling the double clutch transmission in accordance with the exemplary embodiment of the present invention.

Referring to FIG. 9, as described above, the combined target pressure is set to perform the pre-fill pressure control and the fill pressure control, and furthermore, when the shake pressure is added to pressurize in the pre-fill control section, the actual pressure improves the hydraulic delay to meet the combined target pressure, thus preventing the response delay from occurring.

Accordingly, the hydraulic control method and the hydraulic control system for controlling the double clutch transmission in accordance with an exemplary embodiment of the present invention can secure the hydraulic control responsiveness only by the hydraulic control to perform a control of improving the oscillation and the shift feeling, and also introduce the high-performance hydraulic fill pressure control to secure the responsiveness and also to improve the control precision.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch hydraulic control method, comprising:
when a gear shift signal is detected in a clutch controller, performing, by the clutch controller, a clutch pack flow rate control, which pre-fills a flow rate for clutch engage in a clutch pack of a clutch before shifting,
wherein the clutch pack flow rate control includes:
controlling a pre-fill pressure performing on the clutch pack up to a return spring preload amount; and
controlling a fill pressure overcoming the return spring preload amount and performing controlling of the fill pressure until the clutch pack is compressed.

2. The clutch hydraulic control method of claim 1, wherein the clutch pack flow rate control starts upon a clutch release.

3. The clutch hydraulic control method of claim 2, wherein the clutch release makes a determination as to whether the flow rate of the clutch pack is drained.

4. The clutch hydraulic control method of claim 1, wherein the controlling of the pre-fill pressure includes:
setting a pre-fill target pressure for the clutch pack;
controlling a pre-fill flow path filling the flow rate in a flow path connected to the clutch pack; and
controlling a pre-fill hydraulic pressure forming the pre-fill target pressure on the clutch pack.

5. The clutch hydraulic control method of claim 4, wherein the pre-fill target pressure is set when a clutch engagement signal depending upon the gear shift signal is detected.

6. The clutch hydraulic control method of claim 5, wherein the pre-fill target pressure upon detection of the clutch engagement signal is set to be higher than the pre-fill target pressure upon non-detection thereof.

7. The clutch hydraulic control method of claim 1, wherein the controlling of the fill pressure includes:
controlling a FILL target pressure applied to the clutch pack by setting the FILL target pressure for the clutch pack into a fill phase section;
controlling of adding shake pressure to the FILL target pressure; and
stopping the target pressure terminated after confirming arrival of the FILL target pressure reached with measurement pressure for the clutch pack,
wherein the FILL target pressure is a pressure at which the clutch begins a torque delivery while meeting a clutch touch point, and
wherein the controlling of adding the shake pressure is smoothed by adding a hydraulic vibration of short cycle.

8. The clutch hydraulic control method of claim 7, wherein the fill phase section is set to a Chop phase in which FILL CHOP pressure is formed, a Dec1 phase in which a FILL BASE pressure is formed, a Hold phase in which a FILL HOLD pressure is formed, and a Dec2 phase in which the FILL target pressure is formed,
wherein the controlling of the fill target pressure is applied in an order of the Chop phase, the Dec1 phase, the Hold phase, and the Dec2 phase,
wherein the stopping of the target pressure is performed when the measurement pressure is greater than a clutch ENGAGE target hydraulic pressure of a Shifting switching phase following the Dec2 phase,
wherein the FILL CHOP pressure, which is a CHOP section formed in an initial FILL control and is a high pressure formed during a predetermined time to overcome an inertia of an initial hydraulic pressure upon formation of a FILL control pressure, the FILL BASE pressure, which is a pressure for a CHOP to form a relatively narrow, high trajectory control pressure while sloping down hydraulic height, the FILL HOLD pressure is a main pressure for a FILL control,
wherein the Chop phase, the Dec1 phase, the Hold phase, and the Dec2 phase are a section constituting the fill phase section from 0 to 5 phases, and
wherein the clutch ENGAGE target hydraulic pressure is a pressure that a hydraulic pressure, which fills a clutch PACK volume after a corresponding clutch has applied a pressure exceeding the return spring preload amount or more.

9. The clutch hydraulic control method of claim 8, wherein each of the FILL CHOP pressure, the FILL BASE pressure, the FILL HOLD pressure, and the FILL target pressure is applied to the clutch pack with a specific threshold value, and the application thereof is stopped upon reaching the specific threshold value.

10. The clutch hydraulic control method of claim 9, wherein the FILL CHOP pressure is greater than the FILL BASE pressure, the FILL BASE pressure is greater than the FILL HOLD pressure, and the FILL target pressure is equal to or greater than the clutch ENGAGE target hydraulic pressure.

11. The clutch hydraulic control method of claim 7, wherein the shake pressure is set to the fill phase section.

12. The clutch hydraulic control method of claim 11, wherein the shake pressure is formed by a cycle hydraulic vibration of a valve for supplying the flow rate to the clutch pack.

13. The clutch hydraulic control method of claim 12, wherein the shake pressure is set to have a cycle.

14. A double clutch transmission system, comprising:
the clutch controller of claim 1 and configured for performing the clutch pack flow rate control by a pre-fill pressure control setting to the flow rate in the clutch up to the return spring preload amount in a clutch release in which the flow rate of the clutch is all drained in the clutch pack when the gear shift signal is detected; and
a fill pressure control overcoming the return spring preload amount and setting to the flow rate until upon compression of the clutch pack.

15. The double clutch transmission system of claim 14, wherein the clutch controller includes a clutch fill map, and the clutch fill map is provided with a table by mapping pre-fill pressure for the pre-fill pressure control with a fill pressure for the fill pressure control.

16. The double clutch transmission system of claim 14, wherein the clutch controller is configured to control a valve to supply the flow rate to the clutch pack.

17. The double clutch transmission system of claim 14, wherein the valve is a solenoid valve.

* * * * *